United States Patent
Jacobsen

(10) Patent No.: US 11,656,625 B2
(45) Date of Patent: May 23, 2023

(54) SYSTEM FOR EVACUATING ONE OR MORE MOBILE ROBOTS

(71) Applicant: MOBILE INDUSTRIAL ROBOTS A/S, Odense SOE (DK)

(72) Inventor: Niels Jul Jacobsen, Odense SOE (DK)

(73) Assignee: MOBILE INDUSTRIAL ROBOTS A/S, Odense Soe (DK)

( * ) Notice: Subject to any disclaimer, the term of this patent is extended or adjusted under 35 U.S.C. 154(b) by 0 days.

(21) Appl. No.: 17/055,660

(22) PCT Filed: May 9, 2019

(86) PCT No.: PCT/EP2019/061896
§ 371 (c)(1),
(2) Date: Nov. 16, 2020

(87) PCT Pub. No.: WO2019/219490
PCT Pub. Date: Nov. 21, 2019

(65) Prior Publication Data
US 2021/0208592 A1    Jul. 8, 2021

(30) Foreign Application Priority Data

May 18, 2018  (EP) .................... 18173332

(51) Int. Cl.
G05D 1/02    (2020.01)
G05D 1/00    (2006.01)

(52) U.S. Cl.
CPC ......... *G05D 1/0214* (2013.01); *G05D 1/0027* (2013.01); *G05D 1/0282* (2013.01); *G05D 1/0297* (2013.01)

(58) Field of Classification Search
CPC .. G05D 1/0214; G05D 1/0027; G05D 1/0282; G05D 1/0297
See application file for complete search history.

(56) References Cited

U.S. PATENT DOCUMENTS

| | | | |
|---|---|---|---|
| 10,668,617 B2 | 6/2020 | Jacobsen | |
| 10,782,698 B1 * | 9/2020 | Baumann | G08G 1/205 |
| D907,677 S | 1/2021 | Mork et al. | |
| 10,916,029 B2 | 2/2021 | Kabel et al. | |
| D929,478 S | 8/2021 | Mork et al. | |
| 2008/0046134 A1 * | 2/2008 | Bruce | G06Q 10/047 |
| | | | 701/1 |

(Continued)

FOREIGN PATENT DOCUMENTS

WO    WO-2018108368 A1 *  6/2018  ....... G08G 1/096844

OTHER PUBLICATIONS

Guo J H, et al., "Programming of the Fire Escaping Paths Using Bayesian Estimated Algorithm," 2014 International Symposium on Computer, Consumer and Control, IEEE, Jun. 10, 2014 (Jun. 10, 2014), pp. 271-274, XP032612781, DOI: 10.1109/IS3C.2014.328.

(Continued)

*Primary Examiner* — Aaron L Troost
(74) *Attorney, Agent, or Firm* — Burns & Levinson LLP

(57) ABSTRACT

There is provided a system and method for evacuating one or more mobile robots from a confined area. The system and method involve one or more mobile robots equipped with sensors or receivers for receiving evacuation commands directing the one or more mobile robots to leave the evacuation area and enter a location outside the evacuation area.

20 Claims, 3 Drawing Sheets

(56) References Cited

U.S. PATENT DOCUMENTS

| | | | |
|---|---|---|---|
| 2014/0032114 A1* | 1/2014 | Titus | G01C 21/3694 |
| | | | 701/537 |
| 2015/0088310 A1* | 3/2015 | Pinter | G06Q 50/22 |
| | | | 700/253 |
| 2017/0030725 A1 | 2/2017 | Gordon et al. | |
| 2017/0182459 A1 | 6/2017 | Klidas et al. | |
| 2017/0185085 A1 | 6/2017 | Storfer et al. | |
| 2018/0075619 A1 | 3/2018 | Kabel et al. | |
| 2018/0099412 A1 | 4/2018 | Pinter et al. | |
| 2018/0281178 A1 | 10/2018 | Jacobsen | |
| 2019/0129420 A1* | 5/2019 | Yoshizaki | B60W 60/0015 |
| 2019/0384314 A1 | 12/2019 | Jacobsen | |
| 2020/0004247 A1 | 1/2020 | Jacobsen et al. | |
| 2020/0159238 A1 | 5/2020 | Jacobsen et al. | |
| 2021/0208592 A1 | 7/2021 | Jacobsen | |
| 2021/0223786 A1 | 7/2021 | Jacobsen | |

OTHER PUBLICATIONS

International Search Report and Written Opinion of the International Searching Authority dated Jul. 19, 2019, International Application No. PCT/EP2019/061896 (pp. 15).

* cited by examiner

SYSTEM FOR EVACUATING ONE OR MORE MOBILE ROBOTS

This application is a U.S. national stage filing of International Patent Application No. PCT/EP2019/061896, which was filed on May 9, 2019, and which claims priority to European Patent Application No. 18173332.0, which was filed on May 18, 2018. This application claims priority to International Patent Application No. PCT/EP2019/061896 and to European Patent Application No. 18173332.0. International Patent Application No. PCT/EP2019/061896 and European Patent Application No. 18173332.0 are incorporated herein by reference.

FIELD OF THE INVENTION

The present invention relates to a system and method for evacuating one or more mobile robots from a confined area. Specifically the system and method involve one or more mobile robots equipped with sensors or receivers for receiving evacuation commands directing the one or more mobile robots to leave the evacuation area and enter a location outside the evacuation area.

BACKGROUND OF THE INVENTION

In mobile industrial robot fleets situations occur where certain areas needs to be kept free of one or more mobile robots. Such situations can be fire alarms where the robots must leave areas of fire escape routes or areas around fire doors. Another situation is in hospitals where priority needs to be given for transport of patients in a narrow corridor and where the porter must be able to ensure that robots are not blocking the way during the transport of the patient. Another situation is in a warehouse where certain areas can be used by both robots and large trucks with limited visibility. Here it can also be necessary to evacuate the area for robots in times where the large trucks are entering the area.

Prior art systems typically solves the above mentioned situations by dividing the relevant physical area into sub areas which can all individually be set in two states; i) a state that allows robots to enter the area and ii) a state that does not allow the robots to enter the area. Each robot then check status of each area before it enters the area and only enters if the status allows this. If the status changes when a robot is inside an area the robots simply stops. Alternatively the robots use audio and visual signals when driving in restricted areas as to enhance identification of the presence of the robots.

There is a need to optimize access to limited resources for robots operating in the same space. The optimized access will allow the robots to move more efficiently within a common space as well as perform designated tasks more efficiently. In particular, the optimized access prioritizes the resource allocation to minimize aggregate time robots wait in order to obtain the resources needed to move or perform a task. To this end, there is a need to coordinate the resource allocation and reservation amongst robots. There is a further need to have the robots coordinate the resource allocation and reservation autonomously without human intervention so that the resources can be efficiently allocated in real-time.

Accordingly, there is a need to supplement local navigational techniques with global navigational techniques and independent and autonomous robot operation through coordinated resource allocation

SUMMARY OF THE INVENTION

The present invention solves the above discussed problems by defining a number of individual evacuation zones and letting the robot management system receive evacuation alarms per individual zone and then as soon as this happens send command for robots to evacuate the specific zone as fast as possible. Either just evacuate to outside evacuation zone or to go to specific positions during the alarm.

Accordingly, in a first aspect of the present invention there is provided a system for evacuating one or more mobile robots from specific zones in an area, said system comprising: one or more mobile robots equipped with sensors or receivers for receiving one or more evacuation commands from a source emitting said evacuation commands, whereby the one or more mobile robots evacuate from one or more specific evacuation zones; wherein the system defines an evacuation action to be performed at a zone at which to perform the evacuation for one or more mobile robots, said evacuation action directs the one or more mobile robots to leave the evacuation area and enter a location outside the evacuation area in response to the one or more evacuation commands.

In a preferred embodiment of the invention the one or more mobile robots is/are autonomous mobile robots. In some embodiments the one or more mobile robots are controlled by a robot management system. The robot management system may be located remote from the one or more mobile robots, and it may communicate with the one or more mobile robots via a wireless communication. Also, the robot management system may be configured to process information from the one or more mobile robots, such as information comprising status on which of the robots are inside or outside the evacuation area.

Furthermore, the robot management system may be configured to process commands from an external source, such as an actuator or an ERP system, such as commands comprising activation of alarms.

The mobile robots may be restricted from entering an evacuation zone during a prescribed time following exit from the evacuation zone. The mobile robots may be programmed to move to an alternative location if a specific location is occupied or if a path to the specific location has been obstructed. The specific location may include a least one of a dedicated parking lot for the one or more mobile robots, a specific compartment, or a docking station, The mobile robots may be configured to delete information about the evacuation zone following exit from the evacuation zone and to reset to a pre-evacuation condition. The specific location may be inside or outside of a confined area. The confined area may be a building. The evacuation zone may include at least one of a corridor, a fire emergency zone, an emergency exit, a fire door, or an elevator. The mobile robots may leave the evacuation zone based on a shortest path or a fastest path to one or more locations.

In a second aspect of the present invention there is provided a method for evacuating the one or more mobile robots from specific zones in a confined area. This method involves emitting evacuation commands from a source emitting said commands to one or more mobile robots equipped with sensors or receivers for receiving such evacuation commands, whereby the one or more of the mobile robots evacuate from one or more specific evacuation zones. Importantly the method defines an evacuation action to be performed at a zone at which to perform the evacuation for one or more mobile robots. This evacuation action directs the one or more mobile robots to leave the evacuation area and enter a location outside the evacuation area in response to the one or more evacuation commands.

The one or more mobile robots are restricted from entering the evacuation area during a prescribed time. The one or more mobile robots are programmed to move to an alternative location if the specific location is occupied or if the path thereto has been obstructed. A specific location is selected from the group consisting of dedicated parking lots for the one or more mobile robots, specific compartments, and docking stations. Information obtained by the one or more mobile robots during the evacuation is deleted upon completion of the evacuation thereby resetting the one or more mobile robots to a situation before the evacuation. The confined area is a building.

DETAILED DESCRIPTION OF THE INVENTION

In the following detailed description, numerous details, examples, and embodiments are set forth and described. As one skilled in the art would understand in light of the present description, the system and is not limited to the embodiments set forth, and the system may be practiced without some of the specific details and examples discussed. Also, reference is made to accompanying figures, which illustrate specific embodiments in which autonomous coordination of robots can be practiced. It is to be understood that other embodiments can be used and structural changes can be made without departing from the scope of the embodiments herein described.

Figure 1:
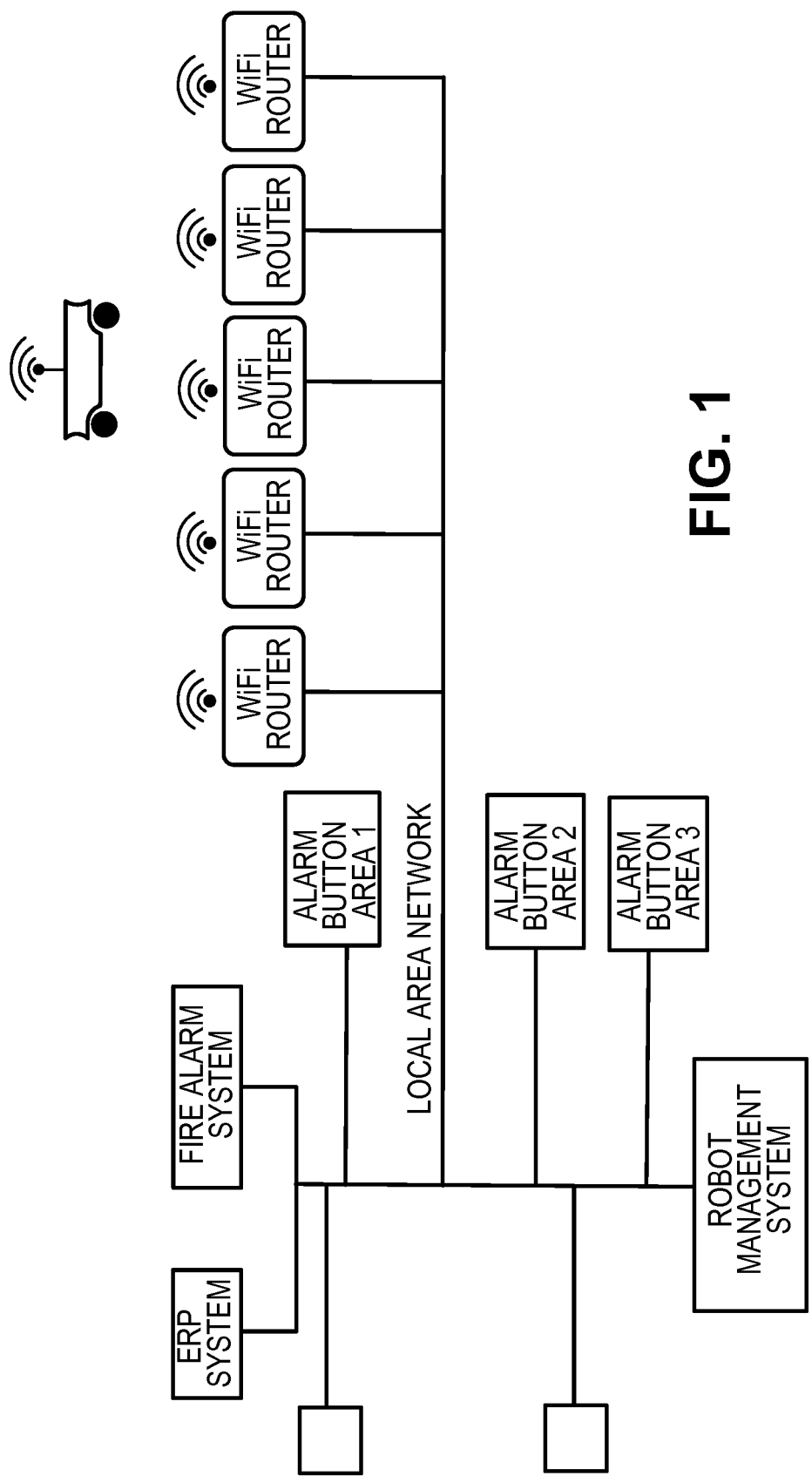
FIG. 1 shows a diagram of the modules applicable to the system of the present invention.

Referring to FIG. 1 there is shown a local area network with different devices for communication. The local area network connects many different systems and devices which need communication between them. Hence it can be seen in the figure that the robot management system is integrated to the enterprise resource planning (ERP) system which handles sales orders, finance and logistic issues. It is also connected to the fire alarm system, the alarm buttons for the different physical areas which individually may require evacuation, and it is connected to the WIFI routers which connect to the mobile robots. This enables the robot management system to receive alarms from either physical buttons or via the ERP or fire alarm systems and send directions for evacuating specific areas to the mobile robots.

Figure 2:
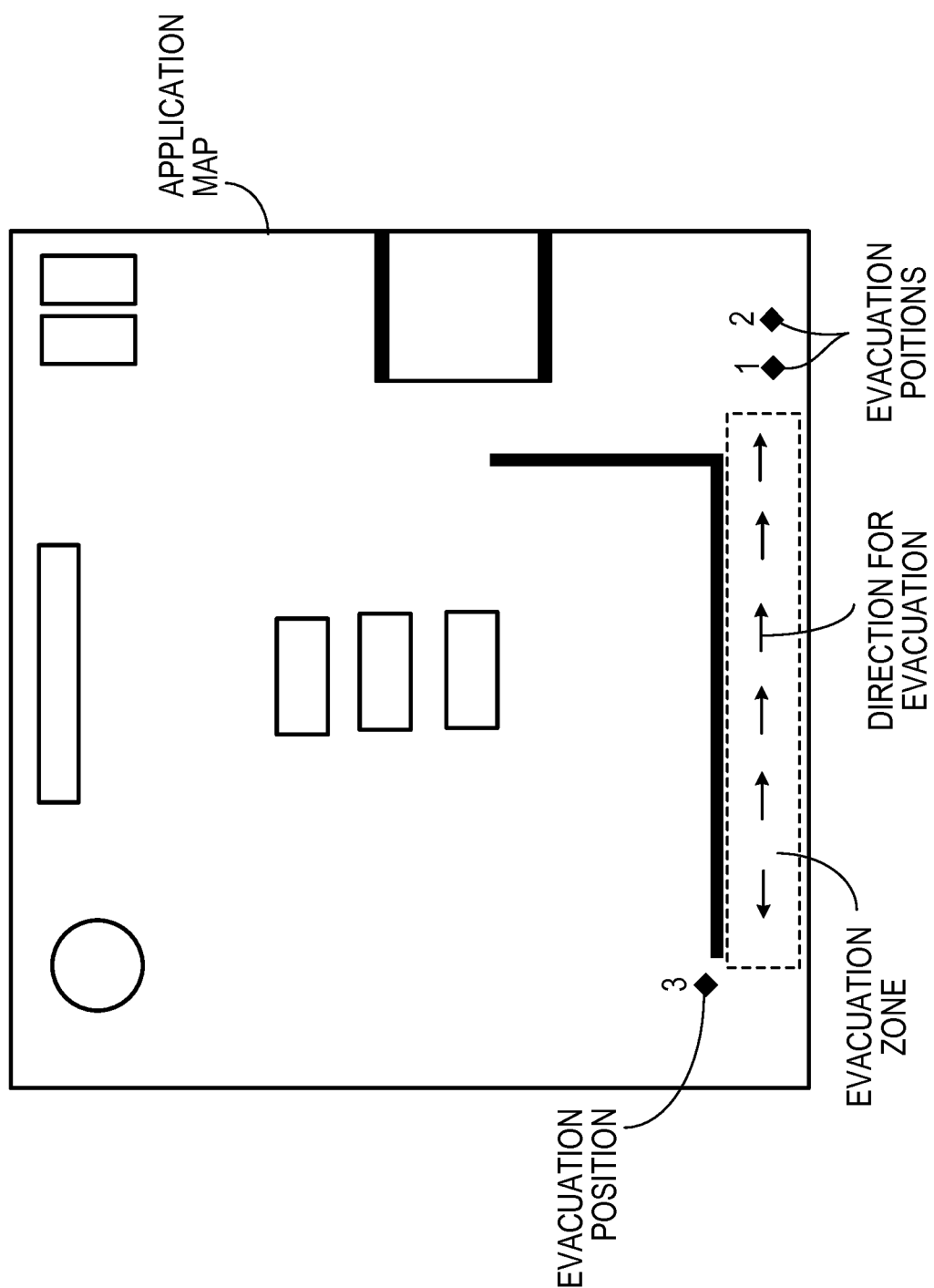
FIG. 2 shows a map with zones and positions applicable to the system of the present invention.

Referring to FIG. 2 there is shows a map of a small physical area in which the mobile robots operate. In the map there is an evacuation zone and 3 evacuation positions. These positions are the positions to which the mobile robots move when evacuating the evacuation zone when an alarm is active. The evacuation zone is assigned with 2 different evacuation directions and this is indicated by the arrows named "Direction for evacuation". This means that when an evacuation alarm is raised the mobile robot will evacuate in different direction depending on its position inside the evacuation zone when the alarm is raised.

Figure 3:
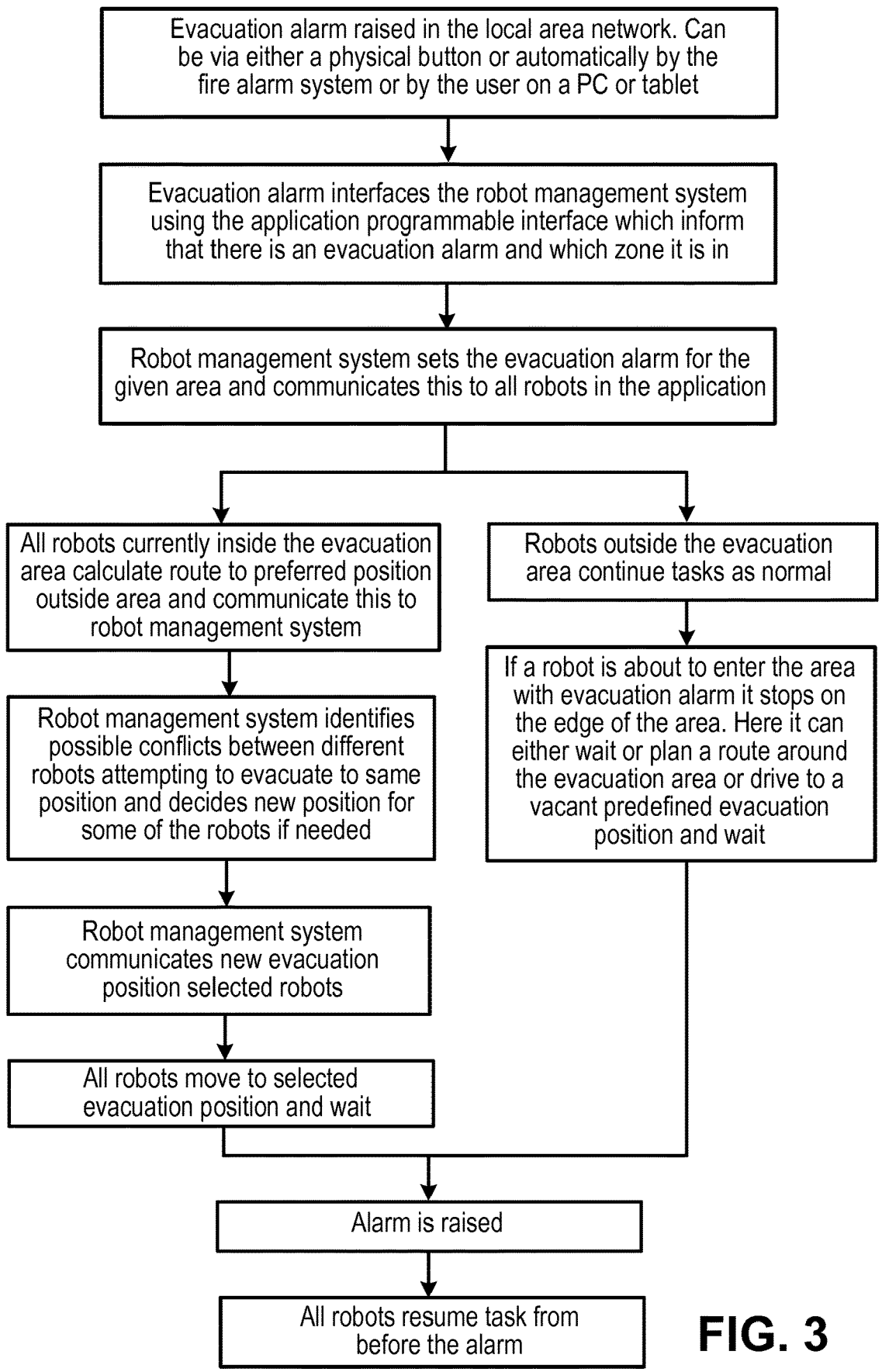
FIG. 3 shows flow diagram applicable to an evacuation procedure with the system of the present invention.

Referring to FIG. 3 there is shown an event diagram illustrating a possible implementation of the logic for evacuation. In this example the robots inside the area that is to be evacuated calculate their preferred route to a position outside the evacuation area and communicates this planned route to the robot management system which will identify possible conflicts and direct some of the robots to alternative positions to solve the conflicts. In another implementation the robot management system dictates the route/direction and evacuation position and communicates this to all robots which all just follow the instructions for evacuation.

The system of the present invention is particularly useful for evacuation purposes in a factory, a warehouse, a hospital or a service/repair shop or similar. Within the scope of the invention one or more mobile robots are configured to transport components from A to B or to perform tasks at various positions in the area. A wireless communication system, such as Local Area Network with WiFi, Zigbee, Z-wave or similar, may be used to control the robots. Alternatively there is a network such as LORA, NB-IoT or LTE.

The system also includes a robot management system which is a SW program that handles and prioritizes jobs of the fleet of robots. The robot management system communicates with all the robots in the area using the wireless communication system.

The robot management system has an application programmable Interface (API) through which other systems can interact with the robot management system. This can for instance be a physical alarm button that is connected to the wireless communication or it can be the fire alarm system that is also connected to the Local Area Network.

When an evacuation alarm is raised for a given area the robots can move out of the area in different ways. One way is to move to a specific position outside the area given for the robot. Another way is to leave to the nearest of a number of different evacuation positions outside the area. Another way is to leave the area moving in a specific direction and then locate the nearest evacuation position outside the area.

If multiple robots are being evacuated at the same time then they can move to the same position outside the area or they can move to different positions if each position can only be occupied by one robot. The combination can also exist where each robot finds the nearest or fastest route to an outside position but each position is only allowed to have one robot parked so the robot management system can communicate with each robot who calculates time or distance to different positions outside the area and sends this information back to the robot management system which decides which robot shall move to which position based on evaluation of the fastest way to evacuate the entire area and still only have one robot parked at each position.

The invention claimed is:

1. A system for evacuating mobile robots from an evacuation zone, the system comprising:
   a robot management system configured to control the mobile robots, the robot management system being configured to receive, from the mobile robots, evacuation routes from the evacuation zone, to identify a conflict in the evacuation routes, and to output evacuation commands to the mobile robots based on resolution of the conflict in the evacuation routes; and
   the mobile robots configured to receive the evacuation commands, the evacuation commands defining evacuation actions to be performed by the mobile robots in the evacuation zone, the evacuation actions for causing the mobile robots operating in the evacuation zone to leave the evacuation zone and to enter one or more locations outside the evacuation zone.

2. The system of claim 1, wherein the mobile robots comprise autonomous mobile robots.

3. The system of claim 1, wherein the robot management system is remote from the mobile robots.

4. The system of claim 1, wherein the robot management system is configured to communicate with the mobile robots wirelessly.

5. The system of claim 1, wherein the one or more of the locations includes a specific location inside or outside of a confined area.

6. The system of claim 5, wherein the mobile robots are programmed to move to an alternative location if the specific location is occupied or if a path to the specific location has been obstructed.

7. The system of claim 5, wherein the specific location comprises a least one of a dedicated parking lot for the one or more mobile robots, a specific compartment, or a docking station.

8. The system of claim 5, wherein the confined area is a building.

9. The system of claim 1, wherein the robot management system is configured to process information from the mobile robots, the information comprising status about whether the mobile robots are inside or outside of the evacuation zone.

10. The system of claim 1, wherein the robot management system is configured to process commands from an external source, the commands for activation of one or more alarms.

11. The system of claim 1, wherein the mobile robots or the robot management system are configured to determine a shortest path or a fastest path out of the evacuation zone.

12. The system of claim 11, wherein the mobile robots are configured to exit the evacuation zone based on the shortest path or the fastest path.

13. The system of claim 1, wherein the mobile robots are restricted from entering the evacuation zone during a prescribed time following exit from the evacuation zone.

14. The system according to claim 1, wherein the mobile robots are configured to delete information about the evacuation zone following exit from the evacuation zone and to reset to a pre-evacuation condition.

15. The system of claim 1, wherein the evacuation zone comprises at least one of a corridor, a fire emergency zone, an emergency exit, a fire door, or an elevator.

16. The system of claim 1, wherein the evacuation actions comprise different mobile robots taking opposite routes out of the evacuation zone.

17. A method for evacuating mobile robots from an evacuation zone, the method comprising:
    receiving, at a robot management system and from the mobile robots, evacuation routes from the evacuation zone;
    identifying, at the robot management system, a conflict in the evacuation routes;
    outputting, from the robot management system, evacuation commands to the mobile robots based on resolution of the conflict in the evacuation routes;
    the mobile robots comprising sensors or receivers that receive the evacuation commands, the evacuation commands instructing the mobile robots to leave the evacuation zone; and
    in response to the evacuation commands, the mobile robots leaving the evacuation zone and entering one or more locations outside the evacuation zone.

18. The method of claim 17, wherein the robot management system is remote from the mobile robots.

19. The method of claim 17, wherein the mobile robots leave the evacuation zone based on a shortest path or a fastest path to the one or more locations.

20. The method of claim 17, wherein different mobile robots take opposite routes out of the evacuation zone.

* * * * *